United States Patent Office 3,102,876
Patented Sept. 3, 1963

3,102,876
ETHYLENE COPOLYMERS STABILIZED WITH A CONJUGATED DIENE
John P. Hogan, Bartlesville, Okla., assignor to Phillips Petroleum Company, a corporation of Delaware
No Drawing. Filed July 29, 1960, Ser. No. 46,066
7 Claims. (Cl. 260—80.7)

This invention relates to copolymers of ethylene and higher 1-olefins and methods for preparing said polymers. In one aspect it relates to an improved method for the copolymerization of ethylene with higher 1-olefins in the presence of a catalyst comprising chromium oxide containing hexavalent chromium and at least one material selected from the group consisting of silica, alumina, thoria, zirconia and composites thereof.

Various processes for the copolymerization of ethylene with higher olefins have been described in the literature. Generally, these polymerizations are carried out in the presence of a catalyst such as the one disclosed in the patent of J. P. Hogan et al., U.S. 2,825,721, which comprises, as the sole essential effective catalytic ingredients, chromium oxide and at least one material selected from the group consisting of silica, alumina, zirconia, and thoria, at least part of the chromium being in the hexavalent state at the initial contacting of hydrocarbon with said catalyst. The copolymers of ethylene with its higher homologues are characterized by their high degree of flexibility as evidenced by low flex temperature, low flexural modulus and high values of percent elongation when compared to the high density polyethylene. In addition the copolymers have improved environmental stress cracking values and excellent low temperature properties. The solid copolymers thus prepared have found numerous uses such as in the fabrication of protective films and containers. However, these same copolymers have a tendency to bleed when exposed to elevated temperatures such as above about 125° F., for a prolonged period of time. This tendency to bleed is particularly prevalent among copolymers having a density between 0.920 and 0.940 gram/cc. Generally, copolymers having a density above about 0.940 gm./cc. do not exhibit bleeding even when stored at 212° F. for thirty days or longer. This invention provides a copolymer of ethylene, and method for producing same, having an increased resistance to bleeding.

It is an object of this invention to provide an improved process for producing olefin polymers.

It is another object of this invention to provide an improved process for producing stabilized copolymers of ethylene.

Still another object of this invention is to provide an improved process for polymerizing ethylene with higher 1-olefins in the presence of a chromium-containing catalyst containing hexavalent chromium.

Yet another object of this invention is to provide an improved copolymer of ethylene with its higher homologues which has a reduced tendency to bleed.

These and other objects of the invention will be more clearly understood from the following detailed description and discussion.

Broadly speaking, these objects are accomplished by polymerizing a mixture of ethylene and a copolymerizable 1-olefin under polymerization conditions in the presence of a chromium-containing catalyst and a stabilizing amount of at least one stabilizer selected from the group consisting of conjugated dienes having the following formula:

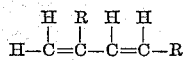

wherein R is selected from the group consisting of hydrogen and methyl radicals.

When the copolymerization of ethylene and a copolymerizable 1-olefin is effected in the presence of the aforementioned stabilizer by the method of this invention, I have discovered that the thus produced copolymer has a reduced tendency to bleed. This is particularly evident when the copolymer is exposed to temperatures above 125° F. for a prolonged period of time. The reason for the unexpected improvement obtained by the incorporation of the stabilizer in the polymerization step is not completely understood. Theories have been advanced which conclude that the exudation, or bleeding, represents a migration of certain low molecular weight polymers present in an apparently heterogeneous copolymer mixture. As used herein, bleeding, exudation, or weeping refers to the surface condition of the copolymer article manifested by the appearance thereon of minute droplets, or by a coating, of a tacky material which appears to be basically different from the remainder of the polymer's surface. This invention is not to be limited by any theory attempting to explain this manifestation.

The results obtained are even more surprising when it is noted that this invention requires only very small amounts of the stabilizer to reduce bleeding. The very small amounts of stabilizer used by the method of this invention is generally not sufficient to materially affect the polymerization reaction yield or rate. However, a decrease in catalyst activity for the polymerization of ethylene with its higher homologues by the incorporation of the small amounts of a stabilizer is not necessarily detrimental in view of the improvement in the end product resulting from this invention.

The olefins which are polymerized in accordance with this process are mixtures of ethylene and at least one copolymerizable 1-olefin. Preferably, the 1-olefins are those which contain from 3 to 8, more preferably 3 to 6, carbon atoms per molecule with no branching closer to the double bond than the 4-position and include propylene, 1-butene, 1-pentene, 1-hexene, 1-octene, 4-methyl-1-pentene, 5-methyl-1-hexene, and the like.

This invention is particularly advantageous when the comonomer feed to the polymerization reactor comprises a major amount of ethylene and a minor amount of at least one copolymerizable 1-olefin. Preferably, the olefin feed will comprise from about 70 to about 95 weight percent ethylene and about 30 to about 5 weight percent copolymerizable 1-olefin. The preferred feed composition to produce a particular copolymer will depend on the particular higher olefin employed. For example, when copolymerizing ethylene and 1-butene the concentration of ethylene is preferably between 80 and 95 weight percent.

It has been found that the copolymers thus produced, as determined from infrared data, contain between about 1½ mole percent to about 5 mole percent, preferably from about 2 to about 4 mole percent, of the ethylene homologue based on the total olefins in the polymer. In general, the amount of ethylene homologues in the copolymer is determined by the proportion of said olefin in the feed to the polymerization reaction but this is not necessarily a linear function thereof.

The polymerization process of this invention is conducted in the presence of a chromium-containing catalyst such as those described in Hogan et al., supra. Preferably this catalyst comprises, as essential catalytic ingredients, chromium oxide and at least one oxide selected from the group consisting of silica, alumina, zirconia, and thoria, with at least part of the chromium in a hexavalent state at the initial contacting of hydrocarbon with said catalyst. Liquid phase or vapor phase operation can be employed. A highly satisfactory method involves contacting the comonomers in the presence of a hydrocarbon diluent in a liquid phase with the suspended comminuted activated catalyst. Polymer thus produced is then separated from the diluent by filtration, hydrocarbon flashing, steam distillation, or the like.

The polymerization of the comonomers according to this invention is preferably, though not necessarily, effected under conditions so as to maintain the polymer product in solution such as maintaining the reaction temperature above the precipitation point of the polymer. However, it is within the scope of this invention to use any desired polymerization conditions.

The ratio of the catalyst components employed in the present process can be varied rather widely depending upon the particular comonomers and the operating conditions. The chromium content of said catalyst is in the range of 0.1 to 10 weight percent and the hexavalent chromium content of said catalyst is at least 0.1 weight percent.

The chromium oxide catalyst is prepared by any suitable method such as those methods described in Hogan et al., supra, preferably by impregnation of the particulate oxide with a solution of chromium oxide or a compound convertible to chromium oxide by calcination, followed by drying and activation of the composite at a temperature in the range of 450 to 1500° F., preferably 750 to 1500° F., for a period of 3 to 10 hours or more. Activation is conducted by heating in a stream of gas preferably a substantially water-free gas containing oxygen.

The stabilizer of this invention is at least one material represented by the following structural formula:

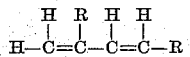

wherein R is selected from the group consisting of hydrogen and methyl radicals. These stabilizers include 1,3-butadiene, isoprene, piperylene, 2-methyl-1,3-pentadiene and mixtures thereof. I have discovered that only a very small amount of the stabilizing compound is required to obtain an improvement in bleed resistance over copolymers produced without the stabilizer of this invention. The amount of stabilizing compound employed is preferably in the range of 0.15 to 0.8 weight part of stabilizer per 100 weight parts of olefin feed, more preferably 0.2 to 0.4 weight part of stabilizer per 100 weight parts of olefin feed.

The stabilizing compound is preferably charged to the polymerization zone prior to the polymerization process but may be added while the reaction is proceeding. A preferred method of operation is to dissolve the stabilizing compound in at least a portion of the hydrocarbon diluent to be used during the polymerization and then add the solution to the reactor prior to charging the reactor with the comonomers.

The polymerization process employing these stabilizing compounds can be carried out as a batch or as a continuous process by processes such as described in Hogan et al., supra. For example, a batch process can be effected by dispersing the chromium-containing catalyst and one or more of the described stabilizers in a diluent which is relatively inert and liquid under the conditions of the process and does not have a deleterious effect on the catalyst. Suitable diluents for dissolving of the stabilizing compound include those used in the polymerization process and include paraffinic, cycloparaffinic, and/or aromatic hydrocarbons. Examples of such diluents include propane, butane, pentane, hexane, cyclohexane, methylcyclohexane, benzene, toluene, xylene, isopentane, 2,2,4-trimethylpentane, nonane, dimethylcyclohexane, and the like. The relative amount of diluent and olefin employed in the polymerization zone depends upon the particular conditions and techniques used and is generally governed by the capacity of the apparatus to effect suitable agitation and heat removal. In general, the polyolefin content of the feed mixture charged to the polymerization reactor is in the range of 0.5 to 25 weight percent of the diluent present in the reactor.

The polymerization can be carried out at temperatures varying over a rather broad range, depending on the olefin and diluent used. Preferably, the temperature is maintained above the solution temperature of the copolymer in the diluent. For example, temperatures of 0 to 500° F., are operable however, it is usually preferred to conduct the reaction at a temperature in the range of 100 to 500° F., more preferably from 225 to 450° F. For instance, when polymerizing ethylene and 1-butene in cyclohexane, it is preferred that the temperature be maintained above 230° F. The pressure employed in the process is sufficient to maintain the reaction mixture substantially in the liquid phase, preferably from atmospheric and below to 1000 p.s.i. or higher. Often a pressure of at least 100 p.s.i. to 700 p.s.i. is preferred. However, gas phase reactions at lower pressures are possible by the method of this invention.

It has been found that various materials have a tendency to inactivate the chromium containing catalyst used in this invention. These contaminants include carbon dioxide, oxygen and water. Therefore it is usually desirable to free the monomers, diluent and catalyst from these materials as well as from other materials which tend to inactivate the catalyst. Any of the known means for removing such contaminants can be employed. Furthermore, the reaction vessel preferably should be purged of air and moisture before carrying out the reaction. In some cases small amounts of contaminants can be tolerated. It is to be understood that the amount of such contaminants present in the reaction mixture shall not be sufficient to substantially inactivate the catalyst.

In a preferred embodiment of this invention, an olefin feed comprising a mixture of ethylene and a copolymerizable 1-olefin, such as 1-butene, is polymerized in a batch process in a reactor containing activated solid chromium oxide on an oxide support, such as silica, and a hydrocarbon diluent, such as cyclohexane, and the stabilizing compound of this invention, such as 1,3-butadiene. Preferably the catalyst is charged separately to the reactor premixed with a portion of the diluent. A portion of the diluent may also be used to form a solution of the stabilizer which is then introduced into the reactor prior to, during, or after the introduction of the monomer. Thereafter, the reactor is heated to the desired temperature and pressure such as a temperature in the range of 230 to 450° F. and a pressure sufficient to maintain the reaction mixture in substantially liquid phase. These condiitons are then maintained for a period of time sufficient to produce the desired amount of polymer. While it is preferred to operate in accordance with the aforementioned charging procedure, it is to be understood that this invention is not limited thereto. Furthermore, the process can be carried out continuously by continuously charging reactants, diluent and catalyst to the reactor and continuously withdrawing a portion of the reaction mixture thereby permitting a suitable residence time. The residence time used in the continuous process can vary widely since it depends to a great extent on the operating temperature, the size of the reactor and the specific combination of monomers to be polymerized. However, the residence time in a continuous process generally falls within the range of 1 second to 10 hours or more. In a batch process the time of reaction can also vary widely such as 15 minutes up to 24 hours or more.

Upon the termination of the polymerization reaction excess olefins are vented and the contents of the reactor are then treated by any suitable method to separate the copolymer product from the diluent and monomer. In many uses of the polymer it may not be necessary to remove the catalyst from the polymer. However, if so desired the catalyst can be separated from the polymer by any suitable method. The polymer is then separated from the diluent by any suitable means, such as precipitating the polymer discharging the polymer solution into hot water thereby flashing water and diluent overhead and causing precipitation of the polymer, or by reducing the temperature of the solution, and decanting, centrifuging, filtering, or other suitable methods of liquid-solid separation, after which the polymer is dried. The diluent and treating agents can be separated by any suitable means, such as fractional distillation, and reused in the process.

The following specific examples illustrate the method of preparing a stabilized copolymer of ethylene with its higher homologues but is not intended to limit the invention to the embodiment shown therein.

EXAMPLE I

This example illustrates the effect of varying the amount of a specific stabilizer, 1,3-butadiene, on the polymerization of a mixture of ethylene and 1-butene.

*Catalyst Preparation*

The catalyst was prepared by impregnating a silica-alumina support with an aqueous solution of chromium trioxide after which it was dried and activated by heating in air at 950° F. for 5 hours. The total chromium content of the catalyst was 2.7 weight percent. After activation the catalyst was protected from moisture and other inactivating agents.

*Olefin Preparation*

Ethylene was dried by passage over activated alumina and metered into the reactor as a gas. The comonomer, 1-butene, was 99.8 weight percent pure and was metered to the reactor as a solution in dry cyclohexane. The cyclohexane had been sulphuric acid-treated, boiled to remove the extraneous gases and stored under a nitrogen atmosphere. The concentration of the 1-butene in cyclohexane solution was about 13.8 to 15.4 weight percent as shown in Table I below. The stabilizer, 1,3-butadiene, was dissolved with the 1-butene in the cyclohexane solution in varying ratios of 1,3-butadiene to 1-butene as shown in Table I.

*Polymerization*

The polymerization of the mixture of monomers was effected in a 1400 ml. jacketed reactor equipped with an arrowhead stirring blade operated at 200 r.p.m. The activated catalyst and 300 grams of cyclohexane were first charged to the reactor which had been previously purged with nitrogen and dried. A nitrogen atmosphere was then maintained in the reactor and the slurry heated to 250° F. with the ethylene and the comonomer solution then being metered to the reactor so as to maintain an ethylene to 1-butene weight ratio as close as possible to 85 to 15. The olefin feed rate was controlled so as to maintain a reaction pressure of approximately 250 p.s.i.g. After a 2-hour reaction period the olefin flow was terminated and the unreacted monomers and cyclohexane vented. The polymer was removed from the reactor and dried in a vacuum oven at less than 10 mm. of mercury at a temperature of 210° F. for 3 to 7 hours. The data for each run are summarized in Table I, part A, while part B of Table I summarizes the properties of the polymer.

TABLE I

*Copolymerization in the Presence of 1,3-Butadiene*

| Run No. | 1 | 2 | 3 | 4 |
|---|---|---|---|---|
| A. Reaction Data: | | | | |
| Catalyst, grams | 0.19 | 0.21 | 0.23 | 0.24 |
| In cyclohexane soln.— | | | | |
| (a) Butene-1, wt. percent | 15.1 | 13.8 | 15.2 | 15.4 |
| (b) 1,3-butadiene, wt. percent of butene-1 | 0.0 | 0.7 | 2.0 | 4.2 |
| Ethylene/butene-1 wt. ratio | 85/15 | 85/15 | 86/14 | 83/17 |
| Butadiene, parts/100 of monomers.[1] | 0 | 0.1 | 0.3 | 0.7 |
| Polymer yield, g./g. of catalyst | 908 | 785 | 627 | 532 |
| B. Properties of Polymer: | | | | |
| Density, g./cc. at 25°C.[2] | 0.933 | 0.931 | 0.936 | 0.942 |
| Melt index[3] | 0.490 | 0.576 | 0.936 | 0.280 |
| Tensile strength, p.s.i.[4] | 2,230 | 2,050 | 2,550 | 3,050 |
| Bleeding, appearance after 7 days at 212° F. | Considerable bleeding. | Considerable bleeding. | No bleeding. | No bleeding. |

[1] Parts by weight per 100 parts by weight ethylene plus butene-1.
[2] Density as used herein is determined by compression molding a slab of the polymer, cooling said molding at a temperature reduction rate of 15 to 20° F. per minute to room temperature, cutting a pea-sized specimen therefrom, and placing said specimen in a 50-ml. glass-stoppered graduate. Carbon tetrachloride and methyl cyclohexane are added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73 to 78° F., the balance is adjusted until the pointer is at zero. The value shown on the scale is taken as the specific gravity.
[3] For melt index, the method of ASTM-D-1238-52T is used with five runs being run at 2-minute intervals, averaging the five weights, discarding any values which deviate from the average by more than 5 weight percent, reaveraging and multiplying by 5 to obtain the amount of extrudate in 10 minutes. If the melt index is low, such as less than 1.0, the High Load Melt Index may be obtained by ASTM D-1238-57T (procedure 5) using a weight of 21,600 grams.
[4] Tensile strength is determined by the method of ASTM-D 638-52T.

The bleeding was observed on strips cut from 6 inches x 6 inches x 0.075 inch sheets which had been molded from polymer produced in each of the above runs. As can be seen from Table I copolymers prepared with 0.1 part and less of 1,3-butadiene per 100 parts of monomers were not resistant to bleeding. However, copolymers prepared by the method of this invention using 0.3 to 0.7 part of 1,3-butadiene per 100 parts of monomers had good resistance to bleeding. Bleeding, where evident, was manifested by the appearance of a tacky coating on the surface of the strip.

EXAMPLE II

Another run is made to illustrate the use of propylene as a comonomer and isoprene (2-methyl-1,3-butadiene) as the stabilizer. The procedure is otherwise identical to that hereinbefore described in Example I.

In this run the ethylene/propylene weight ratio is 85/15, the amount of catalyst is 0.24 gm., and the amount of isoprene is 0.6 gm. per 100 grams of monomers. The polymerization conditions are identical to run No. 4 of Example I with a polymer yield of 553 gms. of polymer per gm. of catalyst.

The resultant polymer has a density of 0.939 and does not exhibit any tendency to bleed after 7 days at 212° F.

While certain examples, structures, composition and process steps have been described for purposes of illustration, the invention is not limited to these. Variation and modification within the scope of the disclosure and the claims can readily be effected by those skilled in the art.

What I claim is:

1. In a process for the polymerization of a mixture of 1-olefins comprising a major amount of ethylene and a minor amount of at least one copolymerizable 1-olefin selected from the group consisting of propylene, 1-butene, 1-pentene, 1-hexene, 1-octene, 4-methyl-1-pentene and 5-methyl-1-hexene under polymerization conditions in the presence of a hydrocarbon diluent and a catalyst comprising chromium oxide and at least one material selected from the group consisting of silica, alumina, zirconia, and thoria, at least part of the chromium being in the hexavalent state, producing a copolymer product and recovering said product having a tendency to bleed, the improvement which comprises polymerizing said mixture in the presence of a stabilizing amount of stabilizer selected from the group consisting of conjugated dienes having the following formula:

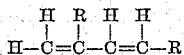

wherein R is selected from the group consisting of hydrogen and methyl radicals, said stabilizing amount being in the range of 0.15 to 0.8 weight part of stabilizer per 100 weight parts of olefin mixture.

2. The process of claim 1 wherein said stabilizer is 1,3-butadiene.

3. The process of claim 1 wherein said stabilizer is isoprene.

4. In a process for the polymerization of a mixture of 1-olefins comprising 70 to 95 weight percent ethylene and 30 to 5 weight percent of at least one copolymerizable 1-olefin selected from the group consisting of propylene, 1-butene, 1-pentene, 1-hexene, 1-octene, 4-methyl-1-pentene and 5-methyl-1-hexene under polymerization conditions in the presence of a hydrocarbon diluent selected from the group consisting of paraffins, cycloparaffins, and aromatic hydrocarbons and a catalyst comprising chromium oxide and a porous oxide selected from the group consisting of silica, alumina, zirconia, and thoria, at least a portion of the chromium being in the hexavalent state, producing a copolymer product having a tendency to bleed and recovering said product, the improvement which comprises polymerizing said mixture in the presence of 0.15 to 0.8 weight part per 100 weight parts of said mixture of a stabilizer selected from the group consisting of conjugated dienes having the following formula:

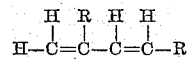

wherein R is selected from the group consisting of hydrogen and methyl radicals.

5. The process of claim 4 wherein said stabilizer is 1,3-butadiene.

6. In a process for the polymerization of a mixture of 1-olefins comprising 70 to 95 weight percent ethylene and 30 to 5 weight percent 1-butene in the presence of cyclohexane and a catalyst comprising chromium oxide and silica, at least a portion of the chromium being in the hexavalent state, in a polymerization zone maintained at a temperature in the range of 230 to 450° F. and a pressure sufficient to maintain substantially all the diluent in a liquid phase, producing a copolymer product having a density in the range of 0.920 to 0.940 gm./cc. and having a tendency to bleed and recover said product, the improvement which comprises polymerizing said mixture in the presence of about 0.15 to about 0.8 weight part of 1,3-butadiene per 100 weight parts of said mixture.

7. In a process for the polymerization of a mixture of 1-olefins comprising 70 to 95 weight percent ethylene and 30 to 5 weight percent propylene in the presence of cyclohexane and a catalyst comprising chromium oxide and silica, at least a portion of the chromium being in the hexavalent state, in a polymerization zone maintained at a temperature in the range of 230 to 450° F. and a pressure sufficient to maintain substantially all the diluent in a liquid phase, producing a copolymer product having a density in the range of 0.920 to 0.940 gm./cc. and having a tendency to bleed and recover said product, the improvement which comprises polymerizing said mixture in the presence of about 0.15 to about 0.8 weight part of isoprene per 100 weight parts of said mixture.

References Cited in the file of this patent
UNITED STATES PATENTS

| | | |
|---|---|---|
| 2,825,721 | Hogan et al. | Mar. 4, 1958 |
| 2,944,048 | Nowlin et al. | July 5, 1960 |